VACUUM CONTROLLED JET TRANSPORT APPARATUS FOR MAGNETIC TAPE

Filed July 15, 1966 2 Sheets-Sheet 1

INVENTOR
ANTHONY W. ORLANDO

Aug. 27, 1968 A. W. ORLANDO 3,398,913

VACUUM CONTROLLED JET TRANSPORT APPARATUS FOR MAGNETIC TAPE

Filed July 15, 1966 2 Sheets-Sheet 2

United States Patent Office 3,398,913
Patented Aug. 27, 1968

3,398,913
VACUUM CONTROLLED JET TRANSPORT APPARATUS FOR MAGNETIC TAPE

Anthony W. Orlando, Highland, N.Y., assignor to International Business Machines Corporation, Armonk, N.Y., a corporation of New York Filed July 15, 1966, Ser. No. 565,549
4 Claims. (Cl. 242—71.8)

ABSTRACT OF THE DISCLOSURE

A tape transport device comprising a U-shaped channel member having a plurality of angled slots in the bottom thereof for supplying air jets and vacuum ports disposed in the sides of said channel adjacent the bottom thereof for drawing off the excess air to eliminate tape flutter.

The present invention is directed to pneumatic transportation means for magnetic tape, paper strips or the like. The present invention is capable of transporting the free end of a tape or the like in a three-sided channel over long distances with no appreciable tape end vibration. The guiding surface of the channel may be either straight or curved or a combination of both.

In prior art devices utilizing a transport mechanism for automatically threading an elongated strip of material from a supply source past an operating element to a take-up means, the path along which the strip material was fed had to be entirely enclosed. A vacuum chamber at low pressure was maintatined at one end of the enclosure to create a pressure differential to feed the free end of the strip material from a supply means along a selected path in the enclosure to the low pressure area for engagement with a take-up member. The present invention obviates the need for an entirely enclosed channel thereby greatly simplifying the construction of the apparatus while providing a device which will readily propagate the tape along the proper path without any undesirable flutter of the leading tape end. The path for transporting the tape may extend between two reels or may be an endless continuous path in the form of a reel.

Other features of the invention will be pointed out in the following description and claims and illustrated in the accompanying drawings, which disclose, by way of example, the principles of the invention and the best mode which has been contemplated of applying these principles.

In the drawing:

FIGURE 1 of the drawing shows a perspective view, partly in section, of the tape transport channel and the various pneumatic ducts in communication therewith;

Generally speaking, the tape transport means of the present invention comprise a U-shaped channel comprised of a pair of side members connected by a cross member. A plurality of pneumatic ports are disposed in the cross member and in the sides of said channel adjacent said cross member. Means adapted to supply air at a positive pressure to the ports in the bottom of said channel and means adapted to maintain the ports along the sides of said channel at a negative air pressure are also provided. It is further contemplated that the above-described tape transport means be formed into a reel which would remain stationary while a plurality of turns of tape are placed thereon.

Figure 1:
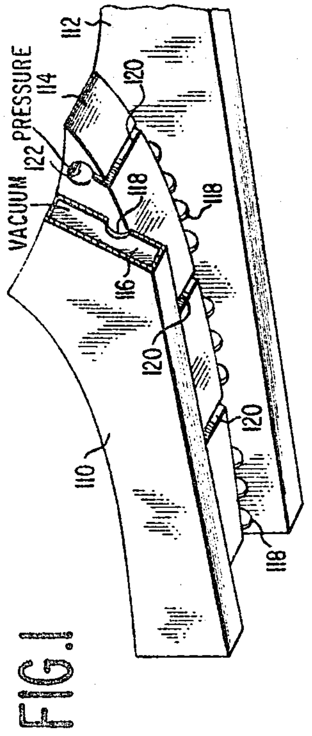

Turning now to the drawing, FIG. 1, a tape transport channel is formed by means of two side members 110 and 112 and cross member 114 secured therebetween in a recessed manner to define a U-shaped channel. The two side members 110 and 112 are provided with hollow chambers or manifolds 116 therein and a plurality of ports 118 which extend through the wall of the side member adjacent the cross member 114. The manifold 116 connects all of the openings 118 together and may take any desired form.

The cross member 114 is formed with a plurality of spaced ports 120 which extend the entire width of the cross member between the side members 110 and 112. The ports 120 are angled with respect to the bottom surface of the cross member 114 such that air under pressure directed outwardly through the ports 120 will tend to direct the tape along the length of the channel. Inwardly of the cross member 114 the ports 120 is connected to a supply chamber 122. The supply chambers 122 for each of the ports 120 may be connected together externally of the tape transport mechanism or they may be connected together within the body of the cross member in a manner somewhat similar to the manner in which the ports 118 are connected together by means of the manifold 116.

The manifold 116 is connected to a vacuum source whereby a negative air pressure is maintained at the openings or ports 118 in the side members 110 and 112. The supply chambers 122 for the ports 120 in the cross member 114 are connected to a suitable means for supplying a positive air pressure. A suitable vacuum means and air pressure means may be utilized and since the details of these features are not important to the present invention, it has not been deemed necessary to illustrate them.

The vacuum ports 118 are generally semicircular in shape with the horizontal center line of these ports coincident to the surface of the cross member 114. The vacuum ports 118 are spaced between the air jets 120.

In the operation of the tape transport device, the free end of the supply reel magnetic tape, not shown, will enter the guide channel. The air jets 120 in the cross member 114 of the channel are used to both lift the tape and drive it. As the tape progresses toward the take-up reel, also not shown, the air from these jets expands and such expansion in the absence of the vacuum ports 118 would cause the tape end to move away from the plate. The buildup of air would also cause the tape end to vibrate violently, thereby damaging the tape. Without the vacuum ports 118, the tape could be transported in this manner only over straight surfaces for a very short distance. However, the vacuum ports 118 of the present invention remove the excess air which tends to build up underneath the tape, thus providing a frictionless surface for the magnetic tape. Thus, by the proper regulation of both the air pressure to the angular jets and vacuum to the semicircular ports, it is possible to transport a tape over an extended straight or curved surface with no appreciable tape end vibration.

The U-shaped channel of the present invention may be disposed in any position and be of any shape; that is, the channel opening may be directed upwardly, downwardly or sideways, and may be straight or curved since the tape will be transported over the surface of the cross member equally well independent of position or configuration.

Figure 2:
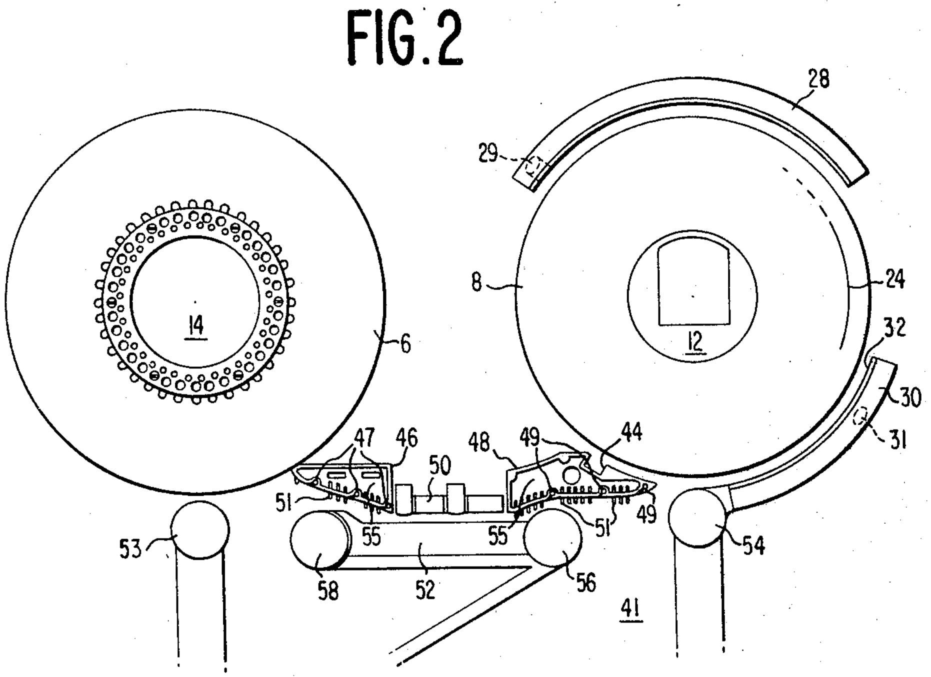
FIGURE 2 is a side elevation view, with portions removed, of the pneumatic threading means as used with a non-enclosed supply reel.
Figure 3:
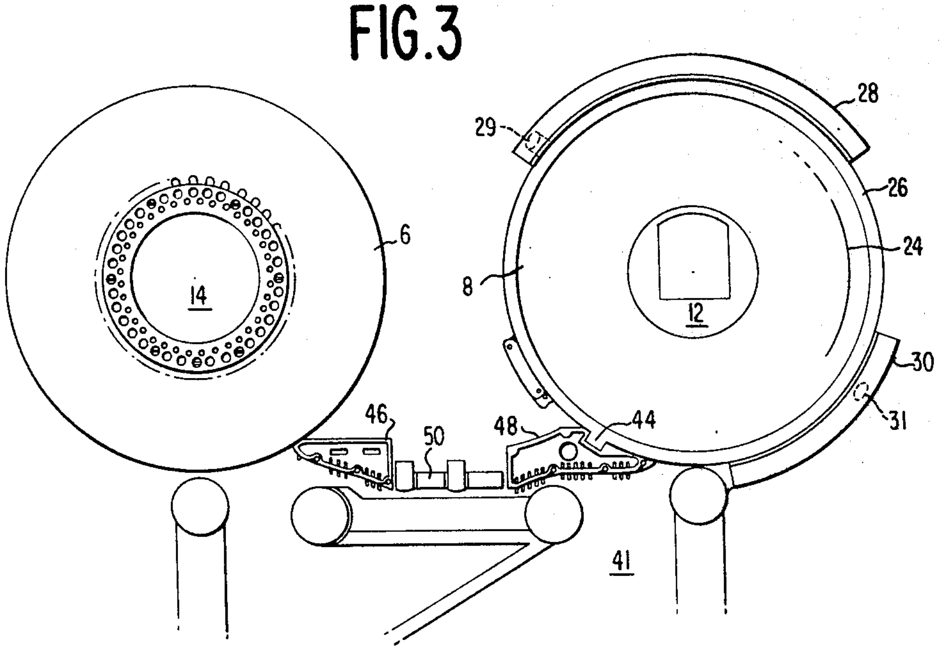
FIGURE 3 is a side elevation view, with portions removed, of the pneumatic threading means as used with a cartridge enclosed supply reel.

A specific form which the tape transport may take is shown in FIGURES 2 and 3. The supply reel has a supply of tape 24 wound thereon and the outer circumference of the reel need not be enclosed (FIG. 2). However, the reel may be enclosed in a wraparound cartridge 26 (FIG.

3) of the type disclosed in U.S. patent application Ser. No. 577,883, filed Sept. 8, 1966, and entitled Toggle Latching Reel Cover with a Sliding Door.

In FIGURES 2 and 3, a pair of restrainers 28 and 30 are mounted on the frame of the machine (not shown), and are provided with air pressure inlet means 29 and 31, respectively. The air pressure inlet 29 in restrainer 28 is utilized only when the tape reel is enclosed in a cartridge and will cooperate with the cartridge (in a manner described in detail in applicant's above-identified copending application) to provide air under pressure to the interior of the cartridge to feed the free end of the tape about the interior of the cartridge as the reel is rotated and to peel the free end of the tape from the body of tape wound on the reel and feed said free end outwardly of the cartridge into the tape transport channel. The cartridge is located relative to the restrainers by key 44.

Lower restrainer 28 is provided with an anti-friction tape feed surface 32 on the interior curved portion thereof. When the reel 8 is located at the suply position without a cartridge, in the manner shown in FIGURE 2, the reel should initially be mounted with the free end of the tape disposed adjacent the anti-friction surface 32 as shown in FIGURE 2. Thus, upon rotation of the reel in the unwinding direction, the free end of the tape will slide freely over surface 32 into the tape transport channel.

In the construction shown in FIGURE 2, the restrainer 30 may be formed as a hollow curved tube or channel with pressurized air supplied to the interior thereof by means of inlet means 31. The surface 32 may be of porous bronze whereby the air under pressure in the interior of restrainer 30 may be fed therethrough to provide an air lubricated surface over which the free end of the tape may slide. In lieu of the air lubrication, the surface 32 could also be formed from any suitable anti-friction material such as Teflon or the like. When a cartridge is used in conjunction with the reel, the supply of air to restrainer 30 may be shut off since the free end of the tape will not come in contact with the restrainer 30. Likewise when the reel is used without a cartridge, the supply of air to restrainer 28 may be shut off.

Once the leading end of the tape enters the tape transport channel, the tape must traverse a relatively long path which may be curved, straight, or a combination curved and straight, past the head assembly 50 to the takeup reel 6. A pair of housing members 46 and 48 are disposed on opposite sides of the head assembly 50 and are provided with a plurality of angularly directed air ports 47 and 49 respectively. These ports may be connected to any suitable source of air under pressure.

The members 46 and 48 may be formed with vacuum plenum chambers 55. One wall of the vacuum plenum chambers 55 is formed by the plate 41 which is a portion of the machine upon which the various members 46, 48, 50 and 52 are mounted. The plate 41 is formed with a plurality of vacuum ports 51 in the form of slots which extend past the lower surfaces of the members 46 and 48. In this manner, the interior of the vacuum plenum chambers 55 is in communication with the tape transport channel in the vicinity immediately adjacent the members 46 and 48. The vacuum plenum chambers 55 are closed by means of a door or the like which would be secured in position parallel to the plate 41 with the members 46 and 48 sandwiched therebetween. The door-like member (not shown) would also be formed with a plurality of vacuum ports similar to the vacuum ports 51.

The jets of air issuing from the ports 47 and 49 help to propel the tape toward the takeup reel and the vacuum ports 51 bleed off the excess air in the same manner as described with respect to the structure shown in FIGURE 1. Therefore, it is seen that the tape transport channel is formed as a three-sided member comprised of top elements 46, 48 and 50, and side elements 41, and the door member. The tape member as it enters the transport channel from the supply reel 8 will be transported along the length of the channel in close proximity to the top surface thereof with virtually no undesirable fluttering of the free end of the tape.

The takeup reel 6 as shown in FIGURES 2 and 3 is constructed and operated similar to the takeup reel shown in applicant's copending application Ser. No. 575,393, filed Aug. 26, 1966 entitled Pneumatically Threaded Tape Drive. Such a reel is formed with a plurality of openings in the hub surface and the plurality of slots in the opposed surfaces of the flanges 16. The openings and the slots are connected to a vacuum source so that when the tape reaches the vicinity of the takeup reel, the free end of the tape will be drawn toward the hub member by means of the high vacuum through the slots. Once the free end of the tape comes in contact with the hub member, the openings 23 therein will securely hold the free end of the tape to the hub member to enable a plurality of turns of tape to be wound on the reel as the reel rotates. After the initial turns are placed upon the reel, the vacuum source to the takeup reel may be discontinued and the friction between the turns of tape will be sufficient to facilitate further winding operations.

Figure 5:
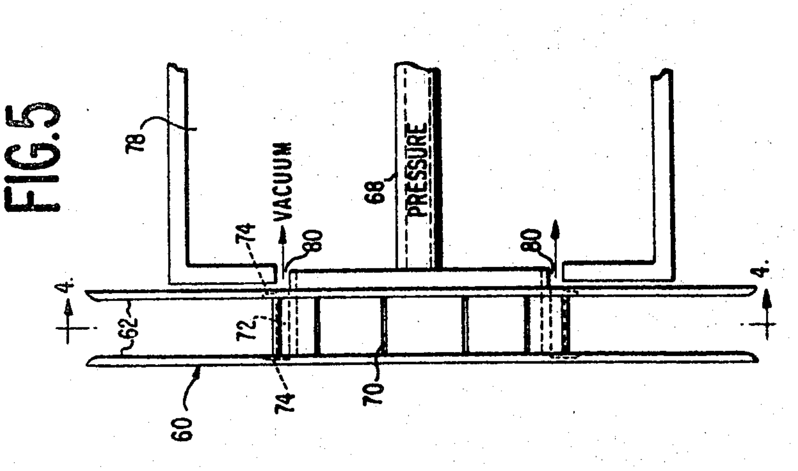
FIGURE 5 is an end elevation view of the modified take-up reel shown in FIGURE 4.
Figure 4:
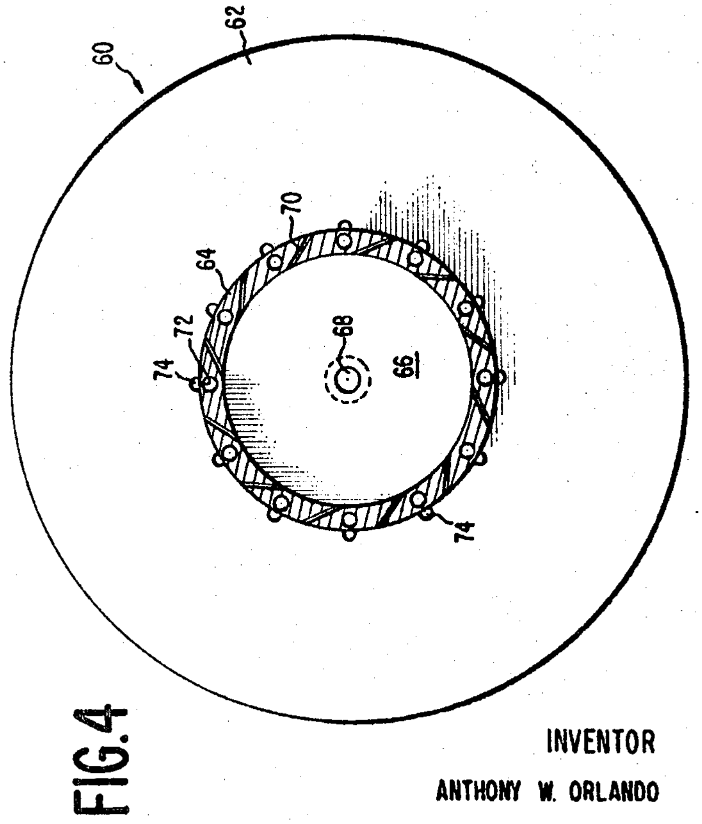
FIGURE 4 is a cross sectional view of a modified take-up reel along the line 4—4 in FIGURE 5.

A modified form of reel structure which may be used as a takeup reel is shown in FIGURES 4 and 5. This modified form of takeup reel embodies the principles of tape transport shown and described with respect to FIGURE 1. In this instance, the channel member shown in FIGURE 1 is formed into a continuous annular endless channel and the reel member thus formed may be mounted in a stationary position upon the machine and a plurality of turns of tape may be fed about the hub of the reel.

The reel, designated generally as 60 in FIGURES 4 and 5, is formed with a pair of flanges 62 and a hub member 64 of annular form. The interior portion of the hub 64 is formed as a pressure plenum 66 which may be supplied with air under pressure through conduit 68. A plurality of slots 70 extend through the annular hub member across the entire width thereof. The slots 70 are angularly disposed with respect to the radius of the hub in such a manner that a flow of air will be created about the circumference of the hub in a clockwise direction as viewed in FIGURE 4. The slots 70 are similar to and function in the same manner as the slots 120 in FIGURE 1. A plurality of holes 72 are formed through the hub 64 parallel to each other and to the axis of the reel member 60. The holes 72 extend through the flange 62 which is mounted adjacent the machine. The opposed faces of the flanges 62 are formed with a plurality of slots or grooves 74 which communicate with the holes 72 and extend radially outwardly therefrom to communicate with the space between the flanges 62 adjacent the external circumference of the hub member 64. The vacuum plenum chamber 78 surrounds the pressure conduit 68 and is provided with an annular outlet 80 which is adapted to communicate with the holes 72 in the hub of the reel when the reel is mounted on the machine in a stationary member. The slots or grooves 74 are equivalent to and function in the same manner as the openings 118 shown and described with respect to FIGURE 1.

Thus, as the tape leaves the tape transport channel shown in FIGURES 2 and 3 with the takeup reel of FIGURES 2 and 3 constructed in accordance with the modification shown in FIGURES 4 and 5, the free end of the tape will be drawn towards the hub member 64 by means of the vacuum through the slots 74 and the free end of the tape will be directed around the circumference of the hub 64 by means of the jets of air from the slots 70. With such a construction, even though the takeup reel is stationary, it is possible to place a large number of turns on the hub of the reel 60 before the friction between the superimposed turns of tape becomes so great as to prevent further feeding of the tape. The blowing air to jets 70 and the vacuum to slots 74 are preferably turned off if reel 60 is to be rotated to further wind tape onto it.

Obviously, many modifications and variations of the present invention are possible in the light of the above teaching. It is, therefore, to be understood that within the scope of the appended claims the invention may be practiced otherwise than as specifically described.

What is claimed is:

1. A channel for pneumatically transporting a flexible web comprising a plurality of blowing-air jet means formed through said channel and angled with respect to said channel to create a moving force on said web and vacuum port means formed along opposite sides of said channel to remove air between said web and said channel for transporting and stabilizing said web.

2. A channel for pneumatically transporting a flexible web according to claim 1 wherein said channel is substantially U-shaped and comprised of a pair of side members connected by a cross member adapted to receive and guide a tape along the length thereof, said air jet means being disposed in said cross member of said channel and angled with respect to the surface of said cross member to enable air jets issuing therefrom to move the tape along said channel, said vacuum port means being disposed to each of said side members of said channel adjacent the cross member adapted to remove excess air which builds up between the tape and the cross member due to the action of the air jets.

3. A channel for pneumatically transporting a flexible web according to claim 1 wherein said channel is a contoured channel.

4. A reel comprising a continuous, annular U-shaped channel having a pair of parallel, radially directed side walls connected together by an annular hub defining cross member adapted to receive and guide a tape about the periphery of said cross member, air jet means disposed in said cross member and angled with respect to the radius of said reel to enable air jets issuing therefrom to feed the tape about the periphery of said cross member to place a plurality of layers of tape on said reel, and vacuum port means disposed in the sides of said channel adjacent said cross member and adapted to remove excess air which builds up between the tape and the cross member due to the action of the air jets.

References Cited

UNITED STATES PATENTS

| | | | |
|---|---|---|---|
| 3,006,650 | 10/1961 | Ellmore | 242—71.8 X |
| 3,127,120 | 3/1964 | Selsted et al. | 242—55.13 |
| 3,134,527 | 5/1964 | Willis | 242—55.13 X |
| 3,281,040 | 10/1966 | Grant | 242—55.12 X |

FRANK J. COHEN, *Primary Examiner.*

NATHAN L. MINTZ, *Assistant Examiner.*